United States Patent
Sloan et al.

(10) Patent No.: US 8,395,350 B2
(45) Date of Patent: Mar. 12, 2013

(54) METHOD OF CHARGING A HYBRID ELECTRIC VEHICLE

(75) Inventors: Adam B. Sloan, Brighton, MI (US); Kevin S. Kidston, New Hudson, MI (US); Emily R. Wu, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 910 days.

(21) Appl. No.: 12/502,303

(22) Filed: Jul. 14, 2009

(65) Prior Publication Data

US 2011/0012553 A1 Jan. 20, 2011

(51) Int. Cl.
*H02J 7/14* (2006.01)
(52) U.S. Cl. .......................................................... 320/105
(58) Field of Classification Search .................... 320/105
See application file for complete search history.

(56) References Cited

U.S. PATENT DOCUMENTS

| | | | |
|---|---|---|---|
| 6,466,024 B1 * | 10/2002 | Rogers | 324/427 |
| 6,769,389 B2 * | 8/2004 | Tamai et al. | 123/179.3 |
| 6,923,279 B2 * | 8/2005 | Shimane et al. | 180/65.1 |
| 7,267,090 B2 * | 9/2007 | Tamai et al. | 123/179.3 |
| 7,769,505 B2 * | 8/2010 | Rask et al. | 701/22 |
| 7,795,838 B2 * | 9/2010 | Singarajan et al. | 320/104 |
| 8,165,739 B2 * | 4/2012 | Matsumoto | 701/22 |
| 2009/0309537 A1 * | 12/2009 | Saito | 320/101 |

OTHER PUBLICATIONS

2007 Ford Escape Hybrid Owner's Manual (336 pgs), pp. 222-252 are directed to "Roadside Emergencies".

* cited by examiner

*Primary Examiner* — Khoi Tran
*Assistant Examiner* — Harry Oh
(74) *Attorney, Agent, or Firm* — Lionel D. Anderson; Reising Ethington P.C.

(57) ABSTRACT

A method for charging a hybrid electric vehicle having a high voltage battery that both propels the vehicle and starts the vehicle. More specifically, if the high voltage battery has a depleted or diminished charge and is unable to start an internal combustion engine, then the method described herein may be used to charge the high voltage battery with energy from a low voltage external power source. In one embodiment, the low voltage external power source is a conventional car battery that is connected to the hybrid electric vehicle by way of jumper cables.

20 Claims, 2 Drawing Sheets

METHOD OF CHARGING A HYBRID ELECTRIC VEHICLE

TECHNICAL FIELD

The present invention generally relates to a hybrid electric vehicle (HEV) having a high voltage battery and, more particularly, to a method for charging a hybrid electric vehicle when the high voltage battery is depleted.

BACKGROUND

A hybrid electric vehicle (HEV) generally includes an internal combustion engine and an electric motor that cooperate with one another to propel the vehicle. Depending on the particular hybrid architecture, the hybrid electric vehicle may use a high voltage battery or a low voltage battery (e.g., a conventional 12 V battery) to start the vehicle.

If the battery that starts the hybrid electric vehicle deteriorates and its charge level falls below a certain threshold, for example, it may not be able to start the vehicle. This can be particularly troublesome for non-plug-in hybrid electric vehicles and for plug-in hybrid electric vehicles that do not have access to an electrical outlet, for example.

SUMMARY

According to one embodiment, there is provided a method for charging a hybrid electric vehicle. The method may comprise the steps of: (a) detecting a failed starting event; (b) determining if the failed starting event involves insufficient energy on a high voltage battery; (c) if the failed starting event does involve insufficient energy on the high voltage battery, then monitoring for a low voltage external power source to be connected to the hybrid electric vehicle; (d) once the low voltage external power source is connected to the hybrid electric vehicle, then converting energy from the low voltage external power source and charging the high voltage battery with the converted energy; and (e) monitoring for one or more fault conditions during step (d) and stopping the converting and/or charging process if such a fault condition is detected.

According to another embodiment, there is provided a method for charging a hybrid electric vehicle. The method may comprise the steps of: (a) detecting a connection between a low voltage external power source and a low voltage circuit that is part of the hybrid electric vehicle; (b) using a power module to step-up the voltage from the low voltage circuit and to charge a high voltage battery; (c) taking one or more readings for the low voltage circuit and/or the high voltage battery; and (d) using the readings for the low voltage circuit and/or the high voltage battery to automatically make adjustments to the process of charging the high voltage battery in step (b).

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The present method may be used with a hybrid electric vehicle that includes a high voltage battery that both propels the vehicle and starts the vehicle. More specifically, if the high voltage battery has a depleted or diminished charge and is unable to start the hybrid electric vehicle, then the method described herein may be used to charge the high voltage battery with a low voltage external power source, such as a conventional 12 V or 42 V car battery using jumper cables.

Hybrid electric vehicles (HEVs) can be described as vehicles that include two or more sources of power in the vehicle powertrain. A hybrid electric vehicle may include one or more electric motors and an internal combustion engine (ICE), for example, where each of these sources of power is coupled to a hybrid transmission. A number of different hybrid electric vehicle designs are known, including plug-in hybrids, serial hybrids, parallel hybrids, and mixed hybrids, to cite a few. Although the following description is provided in the context of an exemplary parallel hybrid system, it should be appreciated that the system and method described herein may be used with any vehicle having a high voltage battery and is not limited to the exemplary embodiment described below. The present method may even be used with electric vehicles (EVs) and vehicles having fuel cells, for example.

Figure 1:
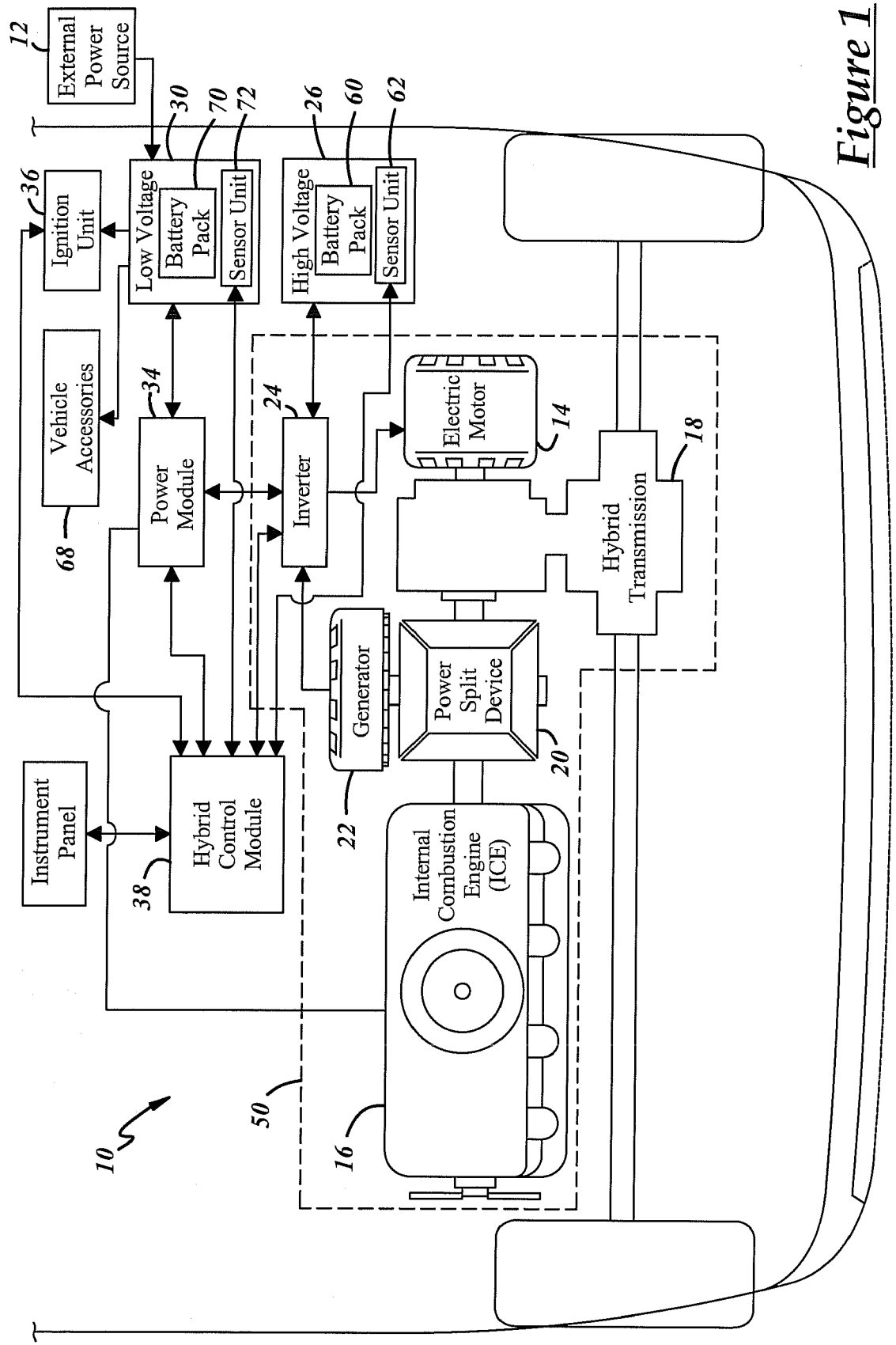
FIG. 1 is a block diagram depicting at least part of an exemplary hybrid electric vehicle (HEV)

With reference to FIG. 1, there is shown a schematic view of an exemplary parallel hybrid system 10 for use in a hybrid electric vehicle, where the hybrid system may be connected to a low voltage external power source 12. According to this exemplary embodiment, system 10 includes one or more electric motors 14, an internal combustion engine (ICE) 16, a hybrid transmission 18, a power split device 20, a generator 22, an inverter 24, a high voltage battery 26, a low voltage battery 30, a power module 34, an ignition unit 36, and a hybrid control module 38. Low voltage external power source 12 may include any low voltage source of power that does not already reside on the vehicle. This includes, for example, car batteries connected by jumper cables (e.g., 12 V and 42 V batteries), other batteries, portable power packs, conventional battery chargers that plug into standard AC wall outlets, etc.

Skilled artisans will appreciate that exemplary system 10 may include more, less or a different combination of components, devices and/or modules than those schematically shown here, and that the present method is not limited to this particular embodiment. One or more of the components, devices and/or modules shown in FIG. 1 may be integrated or otherwise combined with other parts of the hybrid electric vehicle, as the block diagram in that figure is only meant to generally and schematically illustrate one potential hybrid system arrangement. For example, electric motor 14 and generator 22 may be combined into a single motor/generator device, and inverter 24 and power module 34 may be combined into a single inverter/power module device.

Generally, hybrid system 10 uses electric motor 14 and/or internal combustion engine 16 to drive the vehicle wheels via an exemplary hybrid drivetrain 50. The hybrid drivetrain 50 shown here generally includes one or more electric motor(s) 14, internal combustion engine 16, hybrid transmission 18, power split device 20, generator 22, and inverter 24. Because each of these components is generally known and understood in the art, a brief explanation of the exemplary hybrid drivetrain components is provided in lieu of a detailed recitation of their structure and functionality.

Electric motor 14 propels the hybrid electric vehicle using electrical energy stored in high voltage battery 26, and may include any type of suitable electric motor known in the art. While FIG. 1 schematically depicts electric motor 14 as a discrete device, other embodiments including those that incorporate or otherwise combine the electric motor with the hybrid transmission, generator, etc. may also be used. Internal combustion engine 16 propels the hybrid electric vehicle using conventional combustion techniques, and may include any suitable type of engine known in the art. Some examples of suitable engines include gasoline, diesel, ethanol and flex-fuel engines, as well as variants of the internal combustion engine such as the rotary engine, fuel cell, etc. Hybrid transmission 18 and power split device 20 help transfer mechanical output from electric motor 14 and/or internal combustion engine 16 to the vehicle wheels, as well as from the vehicle wheels to generator 22. For example, power split device 20 can selectively direct power from internal combustion engine 16 to hybrid transmission 18 during vehicle propulsion, and can direct power from the vehicle wheels to generator 22 during regenerative braking. Generator 22 uses mechanical motion provided by power split device 20 to generate electrical energy for charging high voltage battery 26, for operating electrical accessories within the vehicle, etc. Any number of suitable generators known in the art may be used. Inverter 24 converts energy in one form to another form and transmits the converted energy to a destination such as high voltage battery 26 or electric motor 14 (e.g., AC power from generator 22 may be converted into DC power for high voltage battery 26). Again, the preceding description of exemplary hybrid drivetrain 50 is only intended to illustrate one potential hybrid arrangement and to do so in a general way. Any number of other hybrid arrangements and architectures, including those that significantly differ from the one shown in FIG. 1, may be used instead.

High voltage battery 26 stores energy that may be used to start internal combustion engine 16 and/or propel the vehicle via electric motor 14, and may be any suitable battery type known in the art. For instance, examples of suitable battery types include lithium ion (e.g., lithium iron phosphate, lithium nickel manganese cobalt, lithium iron sulfide, and lithium polymer), lead-acid, advanced lead-acid, nickel metal hydride (NiMH), nickel cadmium (NiCd), zinc bromide, sodium nickel chloride (NaNiCl), zinc air, vanadium redox, and others. According to an exemplary embodiment, high voltage battery 26 includes a lithium ion battery pack 60 having a number of individual battery cells and a sensor unit 62, and is used to both start the engine and power the electric motor. The battery pack 60 may provide approximately 40-600 V, depending on its particular design and application. For example, a heavy vehicle using a two-mode hybrid system may require a high voltage battery pack capable of providing about 350 V, where a lighter vehicle may only need about 200 V. In another embodiment, the hybrid system 10 may be a belt-alternator-starter (BAS) or BAS-plus type system and thus only require a battery pack that provides about 40-110 V. In any case, battery pack 60 may be designed to withstand repeated charge and discharge cycles and can receive electrical energy from generator 22 through inverter 24.

In the case of powering electric motor 14, high voltage battery 26 may provide electrical energy to the electric motor through inverter 24 or it may provide energy to the motor directly. In the case of starting the hybrid electric vehicle, several different embodiments may be used. In a first embodiment that may be used with a parallel-type hybrid architecture, high voltage battery 26 provides electrical energy to inverter 24 and/or power module 34, which in turn steps down the high voltage and provides it to a low voltage circuit that is part of the vehicle and includes low voltage battery 30. The low voltage circuit is connected with and provides energy to a standard low voltage ignition unit 36, which in turn energizes a solenoid and/or a starter motor (not shown) that turns a crankshaft in the internal combustion engine 16. In this type of arrangement, the high voltage battery 26 provides the energy for starting the vehicle, even though it is provided through a low voltage circuit that includes low voltage battery 30. In another embodiment that may be used with a serial-type hybrid architecture, high voltage battery 26 provides energy to inverter 24, which in turn drives electric motor 14. If the electric motor is mechanically coupled to the internal combustion engine 16, such as the case in a serial hybrid architecture, then rotation of the electrical motor causes a corresponding rotation of the internal combustion engine. This rotation can then start internal combustion engine 16, and can do so without using a standard low voltage ignition unit 36. In both of the exemplary embodiments described above, the high voltage battery 26 is used for both vehicle propulsion and for vehicle starting. Of course, other embodiments, arrangements and/or architectures may be used instead.

Sensor unit 62 may monitor, evaluate, manage and/or otherwise control certain charging and discharging functions related to battery pack 60. In one exemplary embodiment, sensor unit 62 is a battery pack control module (BPCM) that is integrated within high voltage battery 26 and includes one or more sensor(s) coupled to battery pack 60, as well as processing and memory resources. The sensors—which may include status, voltage, current, load, temperature and/or any other suitable sensor—may provide information and data that can be processed by sensor unit 62 and/or forwarded on to other devices, components, modules, etc. in the system. For example, various battery sensor readings can be gathered, processed and saved by sensor unit 62 and then transmitted to hybrid control module (HCM) 38 in the form of a high voltage battery signal, which is simply a data signal that conveys information regarding high voltage battery 26. Although battery pack 60 and sensor unit 62 are schematically shown here as being integrated into a single component within high voltage battery 26, it should be appreciated that other embodiments can involve mounting the sensor unit external to the battery pack and connecting the battery pack-mounted sensors to the sensor unit via some type of communication medium, for example.

Low voltage battery 30 stores energy that may be used to perform secondary or auxiliary functions within the hybrid electric vehicle, such as powering certain low voltage vehicle accessories 68. According to an exemplary embodiment, low voltage battery 30 includes a battery pack 70 (e.g., a traditional 12 V or 42 V lead-acid battery) and one or more battery sensors 72, and may be of any suitable battery type known in the art. In one embodiment, low voltage battery 30 is part of a low voltage circuit that provides energy to a solenoid and/or a starter motor (not shown) that turns a crankshaft in the internal combustion engine 16. Although the low voltage battery may not actually provide the energy that starts the vehicle, as that is provided by high voltage battery 26, it can be part of a low voltage circuit that is connected to power module 34, ignition unit 36, vehicle accessories 68, various controllers such as hybrid control module 38, etc. Low voltage battery 30 may also power one or more vehicle accessories 68. Examples of potential low voltage accessories include various controllers and modules, a radio receiver, a DVD player, a television, a telematics unit and/or other infotainment devices, as well as vehicle interior or exterior lights, auxiliary power plugs, etc. These are, of course, only some of the potential vehicle accessories that may be powered by low voltage battery 30. While an exemplary low voltage battery has been discussed, other batteries, materials, designs, embodiments, etc. could be used with equal success.

Sensor unit 72 may monitor, evaluate, manage and/or otherwise control certain charging and/or discharging functions related to battery pack 70. In one exemplary embodiment, sensor unit 72 includes one or more sensor(s) coupled to battery pack 70, as well as processing and memory resources. The sensors, which may include status, voltage, current, load, temperature and/or any other suitable battery sensor, can provide information and data that can be processed by the sensor unit and/or forwarded on to other devices, components, modules, etc. in the system. For example, various battery sensor readings can be gathered, processed and saved by sensor unit 72 and then transmitted to hybrid control module (HCM) 38 in the form of a low voltage battery signal, which is simply a data signal that conveys information regarding low voltage battery 30. Although battery pack 70 and sensor unit 72 are schematically shown here as being integrated into a single component, it should be appreciated that this is only one potential configuration. For example, sensor unit 72 could be separated from battery pack 70, could be integrated with sensor unit 62, or provided according to some other arrangement. Any suitable battery sensing arrangement known in the art may be used with the high and low voltage battery units 26 and 30.

It should be appreciated that the terms "high voltage battery" and "low voltage battery" are not limited to any particular voltage rating. Instead, these terms are relative in that battery pack 60 of high voltage battery 26 generally has a higher voltage than battery pack 70 of low voltage battery 30. Therefore, while some preferred voltage ratings and ranges are provided above for purposes of illustration, the system and method described herein are not limited to such embodiments.

Power module 34 couples high voltage battery 26 to the low voltage circuit that includes low voltage battery 30, ignition unit 36, and certain low voltage vehicle accessories 68 (e.g., a vehicle radio, interior lights, etc.) and may perform a number of different functions in that capacity. In an exemplary embodiment, power module 34 is an accessory power module (APM) that is electrically coupled to inverter 24 for the exchange of electrical energy, as well as to hybrid control module 38 for the exchange of signals and information. Power module 34 may provide a power module signal to hybrid control module 38 that is representative of the status, operation, etc. of the power module. Power module 34 may include any combination of processing and memory resources, as well as transformers and/or other electrical components used for transmitting or exchanging electrical energy between different components, devices, modules, etc. of hybrid system 10. Some examples of possible power module functions include stepping down DC power from inverter 24 and using it to energize the low voltage circuit, and stepping up DC power from low voltage external power source 12 and using it to charge high voltage battery 26; this second function will be subsequently explained in more detail. It is possible for power module 34 to be combined or otherwise integrated with inverter 24 or some other device, for example.

Ignition unit 36 allows an operator to control the overall status or state of the hybrid electric vehicle, such as whether the vehicle is 'on' or 'off'. For example, ignition unit 36 may include a traditional ignition slot for a vehicle key where the status of the vehicle is dependent on the position of the key (e.g., the vehicle key can be turned through 'accessory', 'off', 'on' and 'start' positions or settings). The ignition unit 36 can be a mechanical unit that uses a key-activated switch, as explained above, or it can be a mainly electrical unit that includes a push button, biometric sensor, proximity sensor, etc. Ignition unit 36 may include any ignition arrangement—keyed, keyless or otherwise—known in the art, and it may provide an electronic ignition signal that is representative of the status of the ignition unit (e.g., the ignition signal could indicate the current setting or status of ignition unit 36). The ignition signal could be provided to sensor unit 62, hybrid control module 38, or to some other component, device, module, etc. in hybrid system 10. In one embodiment, ignition unit 36 further includes a solenoid, starter motor and/or any other suitable component of a vehicle ignition unit.

Hybrid control module 38 gathers information from all around the hybrid electric vehicle and may execute one or more electronic instructions saved in software, firmware, etc. to control certain aspects of the vehicle's operation. In one exemplary embodiment, hybrid control module 38 includes processing resources (e.g., a microprocessor, a microcontroller, an application specific integrated circuit (ASIC), etc.) and memory resources. The hybrid control module 38 can be electronically coupled to high voltage battery 26 for receiving a high voltage battery signal, to low voltage battery 30 for receiving a low voltage battery signal, to power module 34 for receiving a power module signal, to ignition unit 36 for receiving an ignition signal, and to the other devices in hybrid system 10 for receiving signals and information and for providing commands and instructions. Of course, hybrid control module 38 may be coupled to and/or receive information from other components, devices, modules, etc., and the hybrid control module may be integrated or otherwise combined with other parts of the hybrid electric vehicle. In one example, the hybrid control module includes a hybrid control processor (HCP) and is coupled to an engine control module (not shown).

As explained above, the exemplary hybrid system 10 shown in FIG. 1 is only a general and schematic illustration of one potential hybrid system. The method described herein may be used with any number of vehicle systems and is not limited to the specific one shown here.

Figure 2:
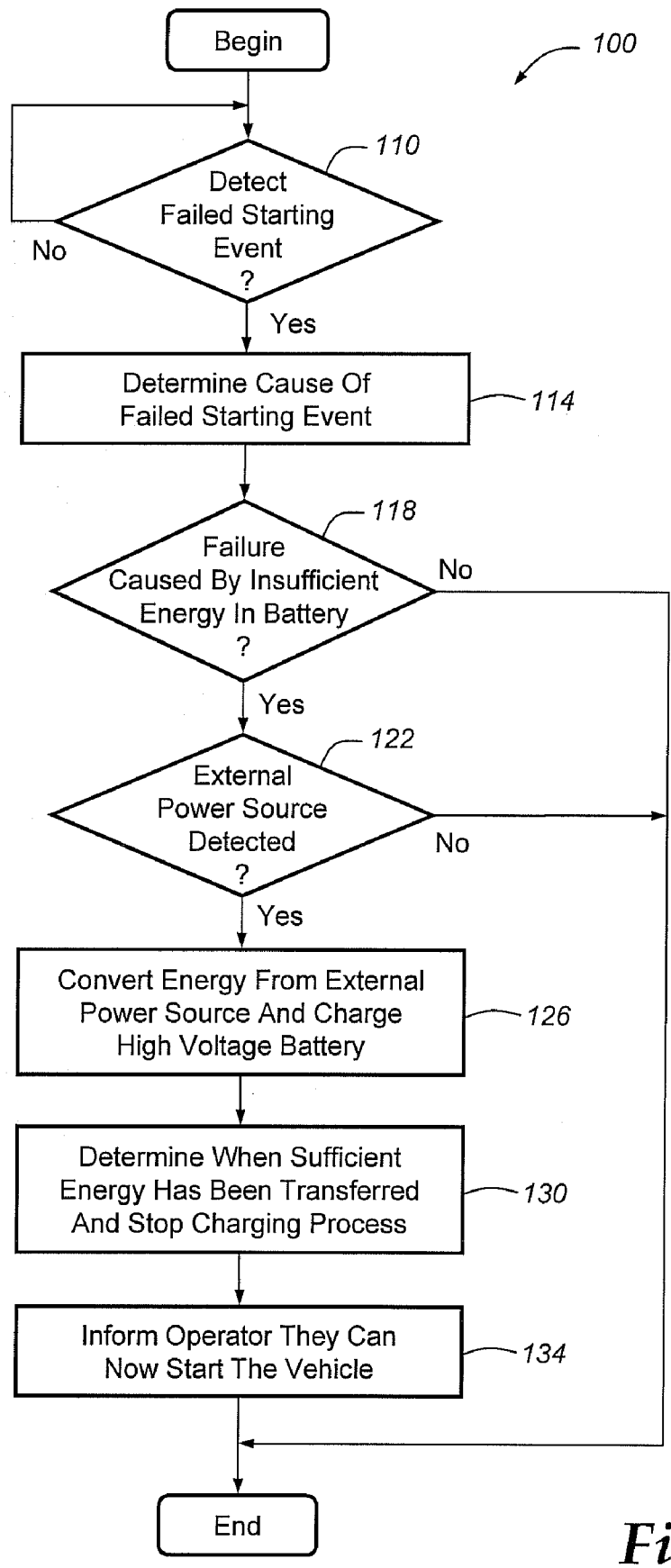
FIG. 2 is a flow chart illustrating some of the steps of an exemplary method for charging a hybrid electric vehicle, and may be used with the exemplary vehicle illustrated in FIG. 1.

Turning to FIG. 2, an exemplary method 100 is provided for charging a hybrid electric vehicle when high voltage battery 26 is too depleted to start internal combustion engine 16. Assuming that other factors are satisfied, the method described herein enables an operator to connect a low voltage external power source 12 (e.g., a battery from another vehicle connected by jumper cables) to the hybrid electric vehicle and provide high voltage battery 26 with enough charge to start internal combustion engine 16. Method 100 may obviate the need for towing the hybrid electric vehicle to a service station in the event of a drained battery, which could be the case for a non-plug-in hybrid electric vehicle and for a plug-in hybrid electric vehicle that does not have access to an electrical outlet, for example. According to an exemplary embodiment, the present method has as little impact as possible on the other vehicle systems and processes (e.g., it does not affect the normal key or ignition start procedures), the method transfers charge in an optimum fashion (e.g., it automatically makes adjustments to the charging process and disables once the high voltage battery has enough charge for a starting event), and the method provides the operator with step-by-step instructions so that the process resembles a conventional 'jump start' procedure with which they are likely familiar. Moreover, the method may be able to accomplish the functions listed above using hardware that already exists on the hybrid electric vehicle.

Beginning with step 110, the method checks for and detects a failed starting event. A 'starting event', as used herein, broadly includes any attempt to start the hybrid electric vehicle. This may include manual starting events (e.g., when an operator inserts a vehicle key into a keyed ignition device or engages a button on a keyless ignition device), or automatic starting events (e.g., when an operator uses a remote starter on a key fob or when some component, device and/or module in the vehicle sends a command to automatically start the engine). The particular manner in which the starting event is performed is not critical, as step 110 simply monitors for and detects when a starting event of any type has failed. Detection of a failed starting event could be performed in one of a variety of ways, such as by querying a component, device and/or module on a periodic basis and eliciting a response (i.e., active monitoring) or by listening and waiting for a status signal that indicates the occurrence of a failed starting event (i.e., passive monitoring). In an exemplary embodiment, hybrid control module 38 detects a failed starting event by the operator by comparing an actual torque output of hybrid drivetrain 50 with a commanded torque output for the same system. When the torque output that is commanded of hybrid drivetrain 50 is greater than that actually being provided by the drivetrain, step 110 knows that a starting event has failed. If a failed starting event is not detected, then the method circles back to step 110 for continued monitoring; if a failed starting event is detected, then the method proceeds to step 114.

Step 114 determines if the failed starting event involves insufficient energy on the high voltage battery. One reason for performing this is to determine whether the failed starting event is attributable to insufficient battery charge or to some other fault condition in the system. If high voltage battery 26 simply has a depleted charge or energy level, then method 100 may proceed with charging that battery so that it can be used to start the hybrid electric vehicle, as will be explained. If, on the other hand, the problem does not involve the energy level of the high voltage battery, then method 100 will not proceed with a charging process as that is not the cause of the failed starting event. There are a number of different methods and techniques that may be used to determine the cause of the failed starting event, including checking the status of high voltage battery 26. In an exemplary embodiment, sensor unit 62 sends a high voltage battery signal to hybrid control module 38 that communicates the status of the high voltage battery, and the hybrid control module uses this information to determine if charge depletion or insufficient energy in the high voltage battery is the probable cause of the failed starting event. In this particular example, "determining the cause of the failed starting event" may not result in pin-pointing the exact source of the failure, but instead involves determining whether or not it is due to insufficient energy in the high voltage battery.

A variety of measurements, factors, metrics, thresholds, etc. may be used singly or in combination for the determination and evaluation in step 114. For example, step 114 could compare a voltage reading for high voltage battery 26 to a minimum starting threshold (e.g., the threshold could be represented as a percentage of a total voltage or as an absolute voltage). To illustrate, if a voltage reading for battery pack 60 is less than 15-20% (minimum starting threshold) of its overall voltage capacity, then the failed starting event could be attributed to insufficient energy in the high voltage battery. Similar thresholds may be applied to a particular collection or grouping of cells within battery pack 60, sometimes referred to as a module, as opposed to the battery pack as a whole. If the voltage on high voltage battery 26 is above the minimum starting threshold, then method 100 may assume that the cause of the failed starting event involves some other source as the high voltage battery has ample charge for starting.

These minimum starting thresholds, which may be calibrated during vehicle development, can be saved in the memory of sensor unit 62, power module 34, hybrid control module 38 and/or some other location. Other criteria or metrics that may be used as a minimum starting threshold include battery current, state of charge (SOC) (e.g., the SOC must be greater than 15-20%), state of health (SOH) and/or any other suitable parameter. In one embodiment, step 114 checks to see if the cause of the failed starting event involves insufficient energy stored in high voltage battery 26 and checks to see if other parameters like battery current, battery temperature, etc. are within acceptable ranges. Any known technique for determining these or other parameters may be used. In step 118, if the cause of the failed starting event involves insufficient energy on high voltage battery 26, then the method proceeds to step 122; if the failure appears to be caused by some other source, then the method may end.

Assuming that the cause of the failed starting event involves insufficient energy in high voltage battery 26 and that there are no other fault conditions in the battery or the system, then step 122 monitors and waits for a low voltage external power source 12 to be connected to the hybrid electric vehicle. This can be accomplished in a number of different ways, including an exemplary embodiment where the operator is instructed to place ignition unit 36 in an 'off' position (e.g., by turning the key to 'off') and to connect low voltage external power source 12 to the hybrid electric vehicle. The process of 'jump starting' hybrid electric vehicle may not be familiar to the operator, thus, step 122 may provide detailed visual and/or audible instructions to the operator for how to do this. These instructions may include information regarding the specific type of low voltage external power source and/or jumper cables that may be used, the particular location on the hybrid electric vehicle where the external power source is to be connected, as well as other particulars that could be useful. In one example, an instrument panel cluster (IPC) 80 is used to visually present the instructions to the operator and to provide the operator with the option of accessing additional information from an interactive menu, such as information found in the vehicle owners manual.

The actual process of monitoring and detecting the low voltage external power source 12 may be performed according to a number of different embodiments. In an exemplary arrangement, low voltage external power source 12 is physically and electrically connected to the low voltage circuit in the hybrid electric vehicle in such a way that hybrid control module 38 or some other device is able to monitor the status of that power source. Jumper cables connected to external power source 12 may be attached to the terminals of low voltage battery 30, remote jump start terminals, or some other terminals that are connected with the low voltage circuit that includes low voltage battery 30. For example, step 122 could take a voltage reading for the low voltage circuit, and compare that voltage reading to a maximum open circuit voltage for the low voltage battery 30. If the measured voltage reading exceeds the maximum open circuit voltage, then step 122 may determine that an external power source is in fact connected. Thus, explaining why the low voltage circuit is exhibiting a higher voltage than the maximum of its typical power source; namely, low voltage source 30. Other techniques (including checking for current, SOC, etc.) may be used instead to detect the presence and/or monitor the status of the low voltage external power source 12. If an external power source is detected, then the method proceeds to step 126; if no external power source is detected, then the method ends. Step 122 may use some type of timer that determines how long the method will look for the low voltage external power source or it may look for the external power source until one is detected, to name a few possibilities.

Next, step 126 converts energy from low voltage external power source 12 and charges the high voltage battery 26 with the converted energy. To illustrate, low voltage external power source 12 may be a 12 V car battery connected to the low voltage circuit of the hybrid electric vehicle by way of jumper cables. In this example, the 12 V energy provided by external power source 12 may not be sufficient to adequately charge high voltage battery 26; thus, power module 34 could be operated in a 'boost mode' to step-up the voltage of the low voltage circuit and to use the stepped-up voltage to charge the high voltage battery 26 (e.g., 12 V from the low voltage circuit could be stepped up to 300 V for charging the high voltage battery). After gathering any needed information, hybrid control module 38 could send a command signal to power module 34 causing it to perform this energy conversion. Other energy conversion techniques could be used in addition to or in lieu of those described above.

During the charging process, step 126 may control the states of a variety of different components, devices and/or modules in order to improve the charging process. For instance, all non-essential devices and operations may be powered down and put into a sleep mode so that an optimal amount of energy can be delivered from the low voltage external power source 12 to the high voltage battery 26. Of course, essential devices and operations that are involved in the charging process (e.g., inverter 24, high voltage battery 26 (including sensor unit 62), low voltage battery 30 (including sensor unit 72), power module 34, hybrid control module 38, instrument panel 80, etc.) may be powered up and maintained in an active mode. These active mode devices may even communicate with one another through a virtual network within the hybrid electric vehicle that enables a limited number of system components to communicate with one another while the remaining system components are inactive. Of course, other communication systems and methods, like LANs and discrete signals, may be used instead.

During charging, the method manages or otherwise controls the charge transfer process from the low voltage circuit to the high voltage battery 26, and does so automatically (i.e., step 126 may automatically oversee the charge transfer process without any further action by the operator). In an exemplary embodiment, step 126 takes one or more readings for the low voltage circuit and/or the high voltage battery, and uses those readings to automatically make adjustments to the charging process. Step 126 is therefore able to use closed loop feedback to actively control the process of converting energy from the low voltage external power source 12 and using it to charge the high voltage battery 26. For example, hybrid control module 38 may take a voltage reading for the low voltage circuit (this is the circuit that the low voltage external power source 12 is connected to), take a voltage reading for the high voltage battery 26, use the voltage readings to determine a current duty cycle, and send a command signal to the power module 34 that causes it to charge the high voltage battery according to the current duty cycle. That is, the output of power module 34 may have a fairly constant voltage and a fluctuating current that varies with duty cycle. The duty cycle may be adjusted on a continuous basis and communicated from hybrid control module 38 to power module 34 every 25 mS or so, for example, in a command signal. As the voltage on low voltage external power source 12 decreases, so too can the duty cycle of the current output of power module 34 (i.e.,
they may be directly proportional to one another); as the voltage on high voltage battery 26 increases, the current output duty cycle can decrease (i.e., they may be inversely proportional to one another); or the duty cycle of the current can remain constant at a maximum level throughout the charging process until the high voltage battery 26 nears charge completion, at which point the duty cycle may be reduced accordingly. Of course, it is also possible for the command signal in step 126 to control some other aspect of the charging process, in addition to or in lieu of the duty cycle for the current flow. The preceding embodiments are only representative of some of the ways in which step 126 can control the charging process, as any other suitable process and technique may be used as well. In general, step 126 attempts to charge the high voltage battery 26 as quickly as possible, but in a controlled manner that uses existing hardware.

During charging, the method monitors for fault conditions and stops the converting and/or charging process if such a fault condition is detected. If a failure or fault condition is detected, then the method may stop the charging process and execute diagnostic or trouble shooting techniques that may be necessary. A message or warning regarding the fault condition could be communicated to the operator via the instrument panel 80. Fault conditions may be monitored by evaluating at least one of the following readings: voltage readings for the high voltage battery 26 or the low voltage battery 30, current readings for the high voltage battery 26 or the low voltage battery 30, temperature readings for the high voltage battery 26 or the low voltage battery 30, or any combination thereof. For example, the method could monitor the voltage, current and/or temperature of the high voltage battery 26 during the charging process to make sure that none of those parameters exceeded maximum thresholds. In addition, fault conditions may be monitored by evaluating at least one of the following readings: status readings for power module 34, inverter 24, hybrid control module 38, or any combination thereof. For instance, the method could check the operational status of converter 24 and/or power module 34 to determine if they are functioning properly. If a fault condition is detected with power module 34, then the method can end without transferring any additional energy through the faulty device.

Similar types of checks may be used to make sure that the ignition unit 36 is not switched out of the 'off' position (i.e., to make sure that the operator is not attempting to start the vehicle during the charging process), to check on the status of high voltage contactors that connect battery pack 60 with the rest of the hybrid electric vehicle, or to make sure that some other charge transfer process is not already underway. For example, a vehicle operator may plug the hybrid electric vehicle into a conventional electrical wall outlet during method 100. If a charge transfer event like this is already in progress, then the method may not want to continue, as these processes may conflict with one another.

Step 130 determines when sufficient energy has been transferred to the high voltage battery 26, and then automatically stops the converting and/or charging process. There are a variety of different ways in which step 130 could monitor the charging process and determine when it is complete. For example, the hybrid control module 38 may monitor and keep track of the number of amp hours for the energy that is delivered to the high voltage battery 26. The measured amp hours can then be compared to an amp hour target and when the amp hour target is reached, the method can automatically stop the converting and/or charging process. Meeting the amp hour target indicates that sufficient energy has likely been provided to the high voltage battery 26 so that it can start the hybrid electric vehicle. In another example, step 130 may compare the voltage or state of charge (SOC) on the high voltage battery 26 to some threshold or predetermined level. The thresholds used in step 130 may be different from the thresholds previously used and could be determined during vehicle development, for example. It should be appreciated that any combination of the preceding charge transfer conditions may be used to determine when to stop providing charge from the low voltage external power source 12 to the high voltage battery 26. In some instances, a single charge transfer condition may be used, in others a combination of charge transfer conditions could be used. Once step 130 determines that sufficient energy has been transferred, hybrid control module 38 may send a command signal to power module 34 instructing it to turn 'off' or otherwise cease the charging process.

Step 134 may then inform the operator that they are now able to start the vehicle. Again, this can be performed in a number of different ways, including by providing visual and/or audible instructions to the operator. It should be appreciated that the description above is directed to a method for charging an electric hybrid vehicle by converting and transferring energy from a low voltage external power source, and that this differs from other methods that use standard high voltage electrical outlets (e.g., 110 V and 220 V outlets). One difference is that the present method may be used to jump start or charge a hybrid electric vehicle when the vehicle is stranded at a remote location where no electrical outlets are available. In such a scenario, the present method enables the use of portable, low voltage external power sources and does not result in the vehicle being towed to a service station or the like. Other differences and benefits also exist.

It is to be understood that the foregoing description is not a definition of the invention, but is a description of one or more preferred exemplary embodiments of the invention. The invention is not limited to the particular embodiment(s) disclosed herein, but rather is defined solely by the claims below Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For instance, the particular sequence or combination of steps in exemplary method 100 may be altered. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for charging a hybrid electric vehicle, comprising the steps of:
    (a) detecting a failed starting event involving an engine;
    (b) determining if the failed starting event involving the engine is the result of insufficient energy on a high voltage battery used both for vehicle propulsion and for vehicle starting;
    (c) when the failed starting event involving the engine is the result of insufficient energy on the high voltage battery, then monitoring for a low voltage external power source to be connected to a low voltage circuit of the hybrid electric vehicle;
    (d) once the low voltage external power source is connected to the low voltage circuit of the hybrid electric vehicle, then converting energy from the low voltage external power source and charging the high voltage battery through the low voltage circuit of the hybrid electric vehicle with the converted energy from the low voltage external power source; and
    (e) monitoring one or more readings and fault conditions with a control module during charging of the high voltage battery by the low voltage external power source, and using the control module to automatically make adjustments to the charging based on the monitored readings and to automatically stop the charging based on the monitored fault conditions.

2. The method of claim 1, wherein step (b) further comprises determining if the failed starting event involves insufficient energy on the high voltage battery by: i) taking a voltage reading for the high voltage battery, and ii) comparing the voltage reading for the high voltage battery to a minimum starting threshold.

3. The method of claim 1, wherein step (c) further comprises instructing an operator to put an ignition system in an 'off' position and to connect the low voltage external power source to the hybrid electric vehicle through visual and/or audible instructions, and then monitoring for the low voltage external power source to be connected to the hybrid electric vehicle.

4. The method of claim 1, wherein step (c) further comprises monitoring for the low voltage external power source by: i) taking a voltage reading for a low voltage circuit that is part of the hybrid electric vehicle and is connected to the low voltage external power source, and ii) comparing the voltage reading for the low voltage circuit to a maximum open circuit voltage for the low voltage circuit.

5. The method of claim 1, wherein step (d) further comprises using a power module to step-up a voltage from the low voltage circuit that is part of the hybrid electric vehicle and is connected to the low voltage external power source, and using the stepped-up voltage to charge the high voltage battery.

6. The method of claim 1, wherein step (d) further comprises using closed loop feedback to actively control the process of converting energy and charging the high voltage battery.

7. The method of claim 6, wherein step (d) further comprises: i) taking a voltage reading for a low voltage circuit that is part of the hybrid electric vehicle and is connected to the low voltage external power source, ii) taking a voltage reading for the high voltage battery, iii) using the voltage readings for the low voltage circuit and the high voltage battery to determine a current duty cycle, and iv) charging the high voltage battery with the converted energy according to the current duty cycle.

8. The method of claim 1, wherein step (e) further comprises monitoring for one or more fault conditions by evaluating at least one reading selected from the group consisting of: a voltage reading for the high voltage battery, a current reading for the high voltage battery, a temperature reading for the high voltage battery, a voltage reading for a low voltage circuit that is part of the hybrid electric vehicle and is connected to the low voltage external power source, a current reading for the low voltage circuit, and a temperature reading for the low voltage circuit.

9. The method of claim 1, wherein step (e) further comprises monitoring for one or more fault conditions by evaluating at least one reading selected from the group consisting of: a status reading for a power module that is used to step-up the voltage from the low voltage circuit, a status reading for an inverter that is used to convert energy, and a status reading for a hybrid control module that is used to control one or more functions of the hybrid electric vehicle.

10. The method of claim 1, further comprising the step of:
powering down one or more non-essential devices and putting them in a sleep mode so that an optimal amount of energy can be delivered from the low voltage external power source to the high voltage battery.

11. The method of claim 10, further comprising the steps of:
powering up one or more essential devices and putting them in an active mode; and
using a virtual network within the hybrid electric vehicle to communicate between the one or more essential devices in the active mode.

12. The method of claim 1, further comprising the step of:
determining when sufficient energy has been transferred to the high voltage battery so that it can start the hybrid electric vehicle, and automatically stopping the process of converting energy and charging the high voltage battery in step (d) when such sufficient energy has been transferred.

13. The method of claim 12, further comprising the steps of:
determining a number of amp hours for the energy that is delivered to the high voltage battery;
comparing the number of amp hours to an amp hour target; and
automatically stopping the process of converting energy and charging the high voltage battery in step (d) when the number of amp hours reaches the amp hour target.

14. A method for charging a hybrid electric vehicle, comprising the steps of:
(a) detecting a connection between a low voltage external power source and a low voltage circuit that is part of the hybrid electric vehicle, where the connection indicates that an operator is attempting to initiate a lump start procedure;
(b) using a power module to step-up the voltage from the low voltage circuit and to charge a high voltage battery that is used for both vehicle propulsion and for vehicle starting during a jump start procedure;
(c) taking one or more readings for the low voltage circuit and/or the high voltage battery during the jump start procedure; and
(d) using a control module to evaluate the readings for the low voltage circuit and/or the high voltage battery and to automatically make adjustments to the process of charging the high voltage battery in order to better optimize the lump start procedure.

15. The method of claim 14, further comprising the steps of:
detecting a failed starting event; and
determining if the failed starting event involves insufficient energy on the high voltage battery, wherein both of these steps are performed before the charging process in step (b).

16. The method of claim 14, wherein step (a) further comprises detecting the connection between the low voltage external power source and the low voltage circuit by:
i) taking a voltage reading for the low voltage circuit, and
ii) comparing the voltage reading for the low voltage circuit to a maximum open circuit voltage for the low voltage circuit.

17. The method of claim 14, wherein steps (c) and (d) further comprise: i) taking a voltage reading for the low voltage circuit that is part of the hybrid electric vehicle and is connected to the low voltage external power source, ii) taking a voltage reading for the high voltage battery, iii) using the voltage readings for the low voltage circuit and the high voltage battery to determine a current duty cycle, and iv) charging the high voltage battery according to the current duty cycle.

18. The method of claim 14, further comprising the step of:
powering down one or more non-essential devices and putting them in a sleep mode so that an optimal amount of energy can be delivered from the low voltage external power source to the high voltage battery.

19. The method of claim 14, further comprising the step of:
determining when sufficient energy has been transferred to the high voltage battery so that it can start the hybrid electric vehicle, and automatically stopping the process of charging the high voltage battery in step (b) when such sufficient energy has been transferred.

20. The method of claim 19, further comprising the steps of:
determining a number of amp hours for the energy that is delivered to the high voltage battery;
comparing the number of amp hours to an amp hour target; and
automatically stopping the process of charging the high voltage battery in step (b) when the number of amp hours reaches the amp hour target.

* * * * *